United States Patent [19] [11] 4,418,599

Raskin [45] Dec. 6, 1983

[54] ELECTRONIC SIGNAL LEVEL CONTROL APPARATUS FOR ACOUSTICAL-ELECTRICAL TRANSDUCER INSTRUMENT

[76] Inventor: Gregory D. Raskin, 4311 Ave. G #B, Austin, Tex. 78751

[21] Appl. No.: 366,541

[22] Filed: Apr. 8, 1982

[51] Int. Cl.[3] .............................................. G01H 1/46

[52] U.S. Cl. .................................... 381/1.05; 84/1.09; 84/1.13; 84/1.16; 84/1.26; 84/1.27; 84/1.08; 381/118

[58] Field of Search ........................ 84/1.04, 1.06–1.09, 84/1.13–1.16, 1.26, 1.27, DIG. 24; 179/1 M, 1 SW, 1 VL

[56] References Cited

U.S. PATENT DOCUMENTS

| | | | |
|---|---|---|---|
| Re. 29,490 | 12/1977 | Shamma | 179/1 VL |
| 3,663,735 | 5/1972 | Evans | 84/1.16 X |
| 3,813,473 | 5/1974 | Terymenko | 84/1.16 |
| 4,151,775 | 5/1979 | Merriman | 84/1.16 X |
| 4,248,123 | 2/1981 | Bunger et al. | 84/1.26 |

*Primary Examiner*—Stanley J. Witkowski
*Attorney, Agent, or Firm*—Arnold, White & Durkee

[57] ABSTRACT

An electrical sound output signal from an acoustical-electrical or piezo electric transducer instrument is made available at selectively switched high and low signal levels by level control apparatus utilizing bistable switching of first and second attenuated electrical sound output signals. A flip-flop circuit toggles between first and second states in response to an input signal pulse generated by actuation of a footswitch. Oppositely-phased output signals produced by the flip-flop are applied to first and second switching FETs controlled thereby so as to be alternately conducting. The FETs are connected between respective first and second attenuators providing high and low level-controlled sound output signals and common output terminals. Accordingly, upon selective actuation of the footswitch, either high or low level controlled sound output signals can be made available at the output terminals. The transition rate of the FET control signals is regulated by timing networks so as to eliminate "dead space" during switching. A signal level indicator is further included to permit user recognition of the level of the electrical sound output signal at the output terminals.

16 Claims, 2 Drawing Figures

ELECTRONIC SIGNAL LEVEL CONTROL APPARATUS FOR ACOUSTICAL-ELECTRICAL TRANSDUCER INSTRUMENT

BACKGROUND OF THE INVENTION

The present invention relates to apparatus for controlling the level of an electrical sound output signal from an acoustical-electrical transducer instrument; and more particularly, it relates to apparatus for loudness control of an acoustic guitar electrical music output signal.

In stage performance with an acoustic guitar, a musician is often called upon to alternately play rhythm and lead. A problem is presented to the musician in that a different "loudness" level is required for each mode of playing. The problem can be solved through the use of a sound man to "ride" the loudness level control. But even this presents a problem in that the sound man cannot know exactly when to ride the level.

One solution proposed is the "volume pedal." Such device is electromechanical and consists of a pedal driven potentiometer. Another form of the device is a pedal driven shutter mechanism which varies the amount of light impinging upon a photocell connected in a signal level control circuit.

The present invention is directed to providing an alternate solution to the problem of loudness level control in the context of acustical-electrical and piezo electric transducer instruments.

SUMMARY OF THE INVENTION

In accordance with the present invention, the electrical sound output signal of an acoustical-electrical or a piezo electric transducer instrument is level-controlled and provided by selective switching at either a high or low level. The instrument producing the electrical sound output signal may, for example, be a guitar, in which case the electrical output signal represents music.

To develop high and low level electrical sound output signals, the instrument output signal is applied to an attenuator circuit producing first and second attenuated sound output signals of different levels. Both attenuated signals are applied to a signal selector which selects one or the other to be applied to output terminals. Switching of the signal selection is controlled by a bistable circuit producing first and second, oppositely-phased electrical control signals. The bistable circuit toggles between states, changing the control signals between first and second signal levels, in response to an electrical pulse signal input thereto. A toggle pulse is produced by any suitable means, such as, for example, a momentary switch-actuated pulse circuit.

Preferably, timing networks are provided to regulate the rate of change of the signal selector control signals upon toggling of the bistable circuit and eliminate dead space in the signal switching action of the selector.

In one embodiment, the attenuator suitably comprises first and second potentiometer devices, the wiper contacts of which provide the two attenuated sound output signals. Signal selection is implemented by a pair of FET switches connected in common to output terminals, and each receiving one of the attenuated signals. The bistable circuit is a flipflop device. The toggle pulse circuit suitably includes a footswitch for effecting pulse production. Rate of change regulation of the FET switch control signals is achieved by use of RC networks establishing both charging and discharging circuit paths of different time constants.

BRIEF DESCRIPTION OF THE DRAWINGS

A written description setting forth the best mode presently known for carrying out the present invention, and of the manner of implementing and using it, is provided by the following detailed description of a preferred embodiment which is illustrated in the attached drawings wherein.

DETAILED DESCRIPTION OF THE PREFERRED EMBODIMENT

Figure 1:
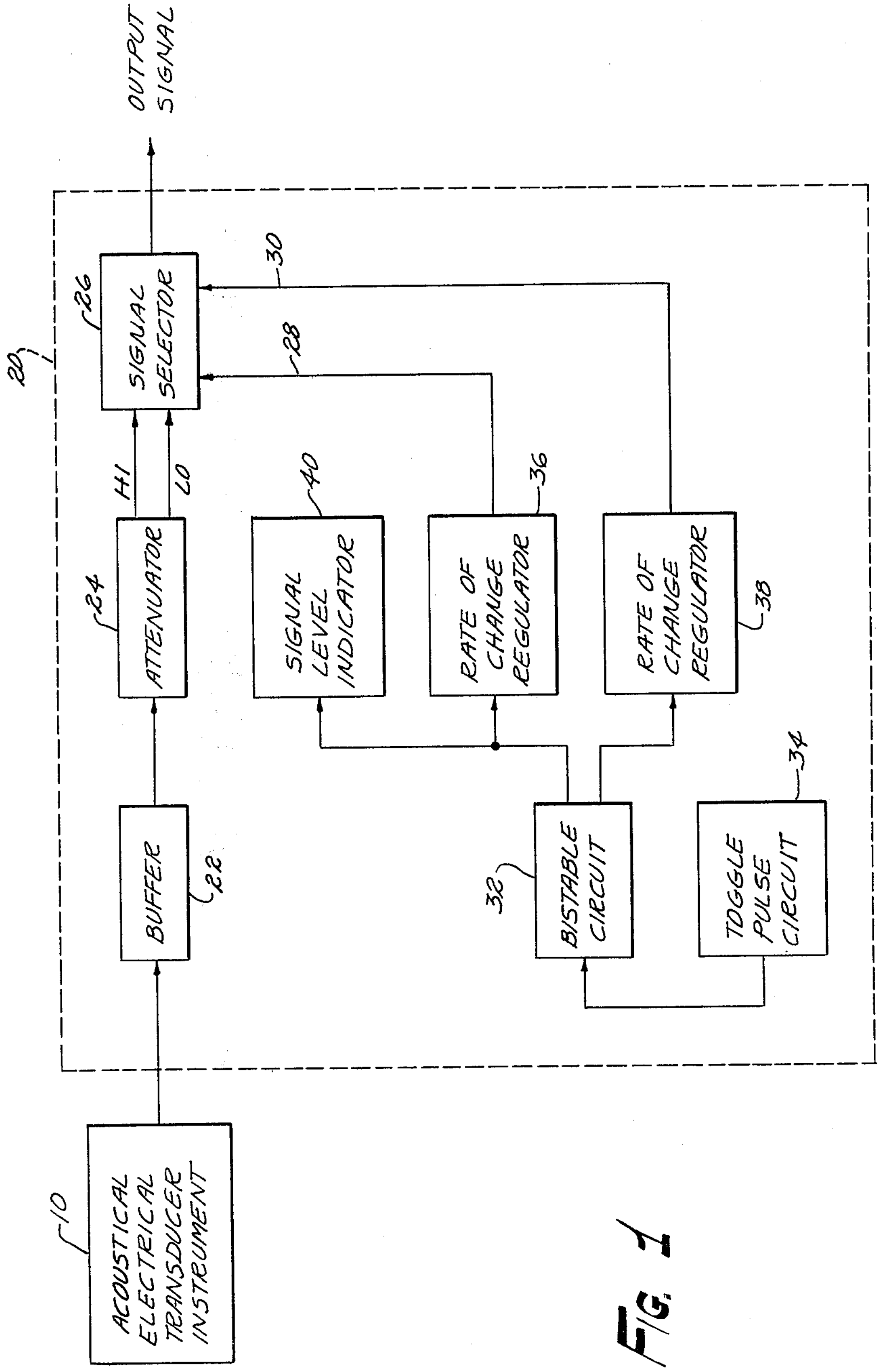
FIG. 1 is a block diagram of output signal level control apparatus in accordance with the present invention for use with an acoustical-electrical transducer instrument to provide selectable, high or low, level-controlled sound output signals.

Referring to FIG. 1 in the drawings, there is a block diagram of signal level control apparatus in accordance with the present invention. Further shown in the diagram of FIG. 1 is the connection of the apparatus to an acoustical-electrical transducer instrument 10. As indicated, the signal level control apparatus 20 receives the electrical output signal from instrument 10 and provides either a high or low level attenuated electrical sound output signal. The Output Signal available from apparatus 20 may be applied to an electrical-acoustical transducer device, such as a speaker, after passage through suitable amplification apparatus.

The electrical sound output signal is preferably applied to a buffer circuit 22 to provide impedance transformation and, if desired, signal gain. The buffered electrical sound output signal is then applied to an attenuator circuit producing first and second attenuated electrical sound output signals of different, high and low, levels. Preferably, attenuator 24 provides individually adjustable attenuation to each signal whereby desired high and low signal levels can be established. Both attenuated electrical sound output signals are applied to a signal selector 26 which provides one or the other of the two signals as the Output Signal.

Switching of signal selector 26 between the high and low level sound output signals is controlled by first and second control signals made available to signal selector 26 over lines 28 and 30. The switching control signals are produced by a bistable circuit 32. The control signals produced are oppositely-phased and change between first and second signal levels upon toggling of the bistable circuit between states. The bistable circuit toggles in response to an electrical pulse signal input thereto from toggle pulse circuit 34.

To provide an overlap of the first and second signal selector control signals in their respective transitions upon toggling of bistable circuit 32, signal level rate of change regulator circuits 36 and 38 are provided. By suitable control of the rate of change of the control signals during their transitions, dead space in the switching action of signal selector 26 (i.e., there is no Output Signal) is avoided. Also, audible "pops" that occur when the signal selector circuitry is driven too rapidly are eliminated; and audible distortion of the output signal during switching is eliminated.

Finally, shown in the diagram of FIG. 1 is a signal level indicator 40, to provide for user recognition of the level of the Output Signal.

Figure 2:
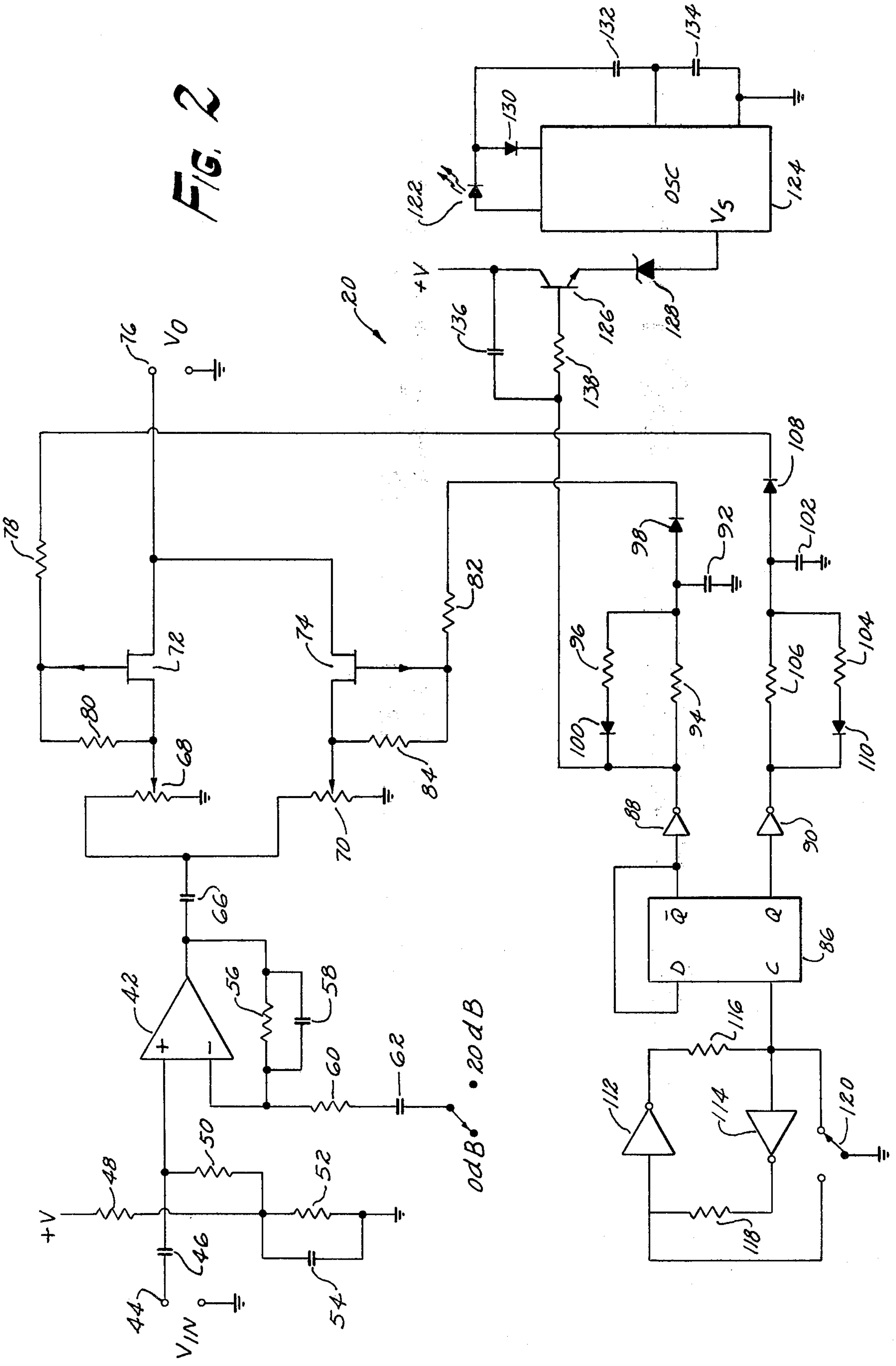
FIG. 2 is a schematic diagram of circuitry for implementing the function blocks shown in the diagram of FIG. 1.

Referring now to FIG. 2, a detailed schematic diagram of apparatus 20 is presented. Buffer 22 is shown to be implemented by an operational amplifier circuit including device 42 connected in a non-inverting configuration. The instrument electrical sound output signal is applied to input terminals 44, and is coupled via capacitor 46 to the noninverting input of device 42. A biasing network of resistors 48, 50, 52, and capacitor 54 is also connected to the non-inverting input of device 42. A feedback network connected to the inverting input of device 42 includes the parallel combination of resistor 56 and capacitor 58, as well as the series combination of resistor 60 and capacitor 62. A switch 64 is further provided to enable the feedback loop configuration to be selectively altered, thereby providing switchable gain of 0 dB or 20 dB.

The buffered electrical sound output signal is coupled via capacitor 66 to first and second potentiometers 68 and 70 which provide variably adjustable attenuation of the signal. The wiper contact of each potentiometer is connected to a respective FET switch device 72, 74. The FET switches are commonly connected to output terminals 76. Resistors 78, 80 provide an input network for FET switch 72; and resistors 82, 84 provide an input network for FET switch device 74.

The FET switch control signals are obtained from D-type flip-flop 86 connected in a configuration so as to toggle upon application of a pulse signal to the clock input thereof. The oppositely-phased signals available from the Q and Q outputs of flip-flop 86 are applied to respective buffering inverters 88 and 90. Connected in series between the buffering inverters and the FET switch circuit input networks are respective time constant networks, each of which has a charging circuit path and a discharging circuit path.

Connected to inverter 88 is a RC time constant network comprising capacitor 92 and resistors 94 and 96. Diode 98 and 100 are further included. When there is a transition in signal level at the output of inverter 88 from a low to a high level, capacitor 92 is charged through resistor 94 and the rise in signal level is applied through diode 98 to the input network of FET switch 74. Following toggling of flip-flop 86 such that the signal output of inverter 88 makes a transition from the high signal level to the low signal level, capacitor 92 is discharged through the parallel combination of resistors 96, 94 and diode 100. Preferably, resistor 96 is much smaller than resistor 94 such that the discharge of capacitor 92 is more rapid than its charging.

A similar time constant circuit is connected to inverter 90, and includes capacitor 102, resistors 104 and 106, and diodes 108 and 110. Again, the charging path for capacitor 102 is through resistor 106, and the discharging of the capacitor is through the parallel combination of resistors 104, 106 and diode 110. Also, the value of resistor 104 is preferably much smaller than the value of resistor 106.

In view of the relative values between resistors 94, 96 and resistors 104, 106, it will be appreciated that upon toggling of flip-flop producing transitions in signal level at the outputs of inverters 88 and 90, the discharging of the charged capacitor, either capacitor 92 or 102 as the case may be, is much more rapid than the rate of charging of the other capacitor. Since FET devices 72 and 74 are p-channel devices, each will conduct when the voltage on the gate falls to near zero volts. Accordingly, FET switch "turn-on" takes place upon discharging of the capacitor in the respective RC time constant network. In view of the relative charging and discharging rates established within each RC time constant network, it will be appreciated that there is a fast turn-on of one FET switch accompanied by a slow turn-off of the other FET switch. This causes a "overlapping" of the conducting states of the FET switches which eliminates "dead space" in the Output Signal during switching between the high and low attenuated electrical sound output signals.

The toggle pulse for flip-flop 86 is produced by a circuit comprising inverters 112, 114, which are cross-connected using resistors 116, 118. The circuit further includes a momentary switch 120.

In order to indicate when the Output Signal at terminals 76 is the high signal level, a light emitting diode 122 is provided. The circuit for driving the light emitting diode is an oscillator circuit 124 powered-up by transistor 126 through diode 128.

It will be readily appreciated that in operation, apparatus 20 provides selective switching upon actuation of switch 120. In a situation where apparatus 20 is being used in conjunction with an acoustic guitar instrument in a stage performance, switch 120 may be a foot switch actuated by the musician using the guitar.

Preferred circuit component for the schematic diagram in FIG. 2 are given as follows:

| | | |
|---|---|---|
| Buffer 22 | | |
| OpAmp | 42 | LF351 or TL071 |
| Capacitor | 46 | .002 uf |
| Resistor | 48 | 100 K |
| Resistor | 50 | 15 Meg |
| Resistor | 52 | 100 K |
| Capacitor | 54 | 10 uf |
| Resistor | 56 | 100 K |
| Capacitor | 58 | 50 pf |
| Resistor | 60 | 10 K |
| Capacitor | 62 | 10 uf |
| Capacitor | 66 | 1 uf |
| Attenuator 24 | | |
| Potentiometers | 68, 70 | 10 K |
| Signal Selector 26 | | |
| FET | 72, 74 | J175 |
| Resistors | 78, 82 | 100 K |
| Resistors | 80, 84 | 1 M |
| Bistable Circuit 32 | | |
| Flip-flop 86 | | CD4013B |
| Toggle Pulse Circuit 34 | | |
| Inverters | 112, 114 | 74C14 |
| Resistors | 116, 118 | 22k |
| Switch | 120 | SPDT snap action momentary footswitch |
| Rate of Change Regulators 36, 38 | | |
| Inverters | 88, 90 | 74C14 |
| Capacitors | 92, 102 | 10 uf |
| Resistors | 94, 106 | 51 K |
| Resistors | 96, 104 | 10 K |
| Diodes | 98, 108 | IN914 |
| Diodes | 100, 110 | IN914 |
| Signal Level Indicator 40 | | |
| Oscillator | 124 | LM3909 |
| LED | 122 | Red LED |
| Diode | 128 | 3.5 v Zener |
| Transistor | 126 | 2N3904 |
| Resistor | 138 | 1 k |
| Capacitor | 136 | 22 uf |
| Capacitors | 132, 134 | 100 uf |
| Diode | 130 | IN914 |

The foregoing description of the present invention has been directed primarily to a particular preferred embodiment for purposes of explanation and illustration. It will be apparent, however, to those skilled in the art that the present invention may be more broadly applied and embodied in connection with sound instruments and apparatus other than a guitar. Many other uses and modifications of the embodiment shown will be apparent to those skilled in the art. It is the intention of the following claims to cover all equivalent modifications and variations as fall within the scope of the invention. Furthermore, as used herein, when a certain signal is referred to, it is understood that the expression of the respective signals includes the various altered forms of such signals, such as amplied versions, buffered versions, filtered versions, etc.

What is claimd is:

1. Output signal level control apparatus for use with a transducer instrument producing an electrical sound output signal, comprising:

(a) input terminals, for coupling to a transducer instrument to obtain the electrical sound output signal;

(b) a first attenuator coupled to said input terminals, for receiving said electrical sound output signal and reducing the level of the signal to produce a first level-controlled electrical sound output signal;

(c) a second attenuator coupled to said input terminals, for receiving said electrical sound output signal and reducing the level of the signal to produce a second level-controlled electrical sound output signal of a level different from the level of said first attenuated signal;

(d) a bistable circuit, for producing first and second oppositely-phased electrical control signals;

said bistable circuit toggling between states and changing said control signals between first and second signal levels in response to an electrical pulse signal input thereto;

(e) means for producing said electrical pulse signal, for toggling said bistable circuit;

(f) a first switch element controlled by said first bistable circuit control signal, said switch element being coupled to said first attenuator and passing said first level-controlled electrical sound output signal therethrough when said first control signal is at one of its two levels;

(g) a second switch element controlled by said second bistable circuit control signal, said switch element being coupled to said second attenuator and passing said second level-controlled electrical sound output signal therethrough when said second control signal is at one of its two levels;

(h) output terminals coupled to said first and second switch elements for providing access to a level-controlled electrical sound output signal.

2. The apparatus of claim 1, further comprising:

means coupled to said bistable circuit, for regulating the rate of change of the level of said first electrical control signal; and means coupled to said bistable circuit, for regulating the rate of change of the level of said second electrical control signal.

3. The apparatus of claim 2 wherein said first electrical control signal regulating means and said second electrical control signal regulating means each comprises a time-determining electrical network having a prescribed time constant.

4. The apparatus of claim 2 wherein:

said first electrical control signal regulating means comprises an electrical network having a first time constant for determining the rate of signal level rise and having a second time constant for determining the rate of signal level fall; and said second electrical control signal regulating means comprises an electrical network having a first time constant for determining the rate of signal level rise and having a second time constant for determining the rate of signal level fall;

the signal rise time constant of each of said networks being greater than its signal fall time constant.

5. The apparatus of claim 1 wherein said bistable circuit comprises a flip-flop device.

6. The apparatus of claim 1 wherein said pulse signal producing means comprises a momentary contact foot switch.

7. The apparatus of claim 1 further comprising a buffer circuit interposed between said input terminals and said first and second attenuators.

8. The apparatus of claim 1, further comprising:

means coupled to said bistable circuit to sense the state thereof, for indicating when said first level-controlled electrical sound output signal is being applied to said output terminals.

9. The apparatus of claim 1 wherein said first and second attenuators are variably adjustable to provide for changing the level of the level-controlled output signals produced thereby.

10. Output signal level control apparatus for use with a transducer instrument producing an electrical sound output signal, comprising:

(a) input terminals, for coupling to an acoustical-electrical transducer instrument to obtain the electrical sound output signal;

(b) means coupled to said input terminals, for producing first and second attenuated electrical sound output signals of different levels;

(c) output terminals;

(d) means for selecting one of said first and second attentuated electrical sound output signals and providing same to said output terminals in response to the levels of first and second control signals applied thereto;

(e) a bistable circuit, for producing first and second oppositely-phased electrical control signals for controlling said electrical sound output signal selecting means, said bistable circuit toggling between states and changing said control signals between first and second signal levels in response to an electrical pulse signal input thereto; and (f) means for producing said electrical pulse signal, for toggling said bistable circuit.

11. The apparatus of claim 10, further comprising:

means coupled to said bistable circuit, for regulating the rate of change of the level of said first electrical control signal; and means coupled to said bistable circuit, for regulating the rate of change of the level of said second electrical control signal.

12. The apparatus of claim 10 wherein said bistable circuit comprises a flip-flop device.

13. The apparatus of claim 10 wherein said pulse signal producing means comprises a momentary contact foot switch.

14. The apparatus of claim 10 further comprising a buffer circuit interposed between said input terminals and said attenuation means.

15. The apparatus of claim 10, further comprising:

means coupled to said bistable circuit to sense the state thereof for indicating when said first level-controlled electrical sound output signal is being applied to said output terminals.

16. Output signal level control apparatus for use with a musical instrument producing an electrical music output signal, comprising:

input terminals, for coupling to a musical instrument to obtain the electrical music output signal;

a first potentiometer coupled to said input terminals, for receiving said electrical music output signal and providing a variably adjustable reduction in the level of the signal to produce a high level electrical output signal;

a second potentiometer coupled to said input terminals, for receiving said electrical music output signal and providing a variably adjustable reduction in the level of the signal to produce a low level electrical music output;

a flip-flop circuit having a clock input and first and second outputs, for producing first and second oppositely-phased electrical control signals;

said flip-flop circuit being connected in a circuit configuration so as to toggle in response to a pulse signal applied to the clock input, and change the levels of said control signals;

means coupled to said flip-flop circuit, including a foot actuated switch, for producing a pulse signal to toggle said flip-flop on command;

a first RC network connected to the first flip-flop circuit output and having a charging time constant and a discharging time constant, for regulating the rate of change of said first control signal as it makes rising and falling transitions, the charging time constant of said network being greater than the discharging time constant;

a second RC network connected to the second flip-flop circuit output and having a charging time constant and a discharging time constant, for regulating the rate of change of said second control signal as it makes rising and falling transitions, the charging time constant of said network being greater than the discharging time constant;

a first transistor element connected to said first potentiometer and controlled by said first control signal, for conducting said high level electrical music output signal therethrough when said first control signal is at a specified one of its two levels, a second transistor element connected to said second potentiometer and controlled by said first control signal, for conducting said low level electrical music output signal therethrough when said second control signal is at a specified one of its two levels; and output terminals coupled to said first and second transistor elements for providing access to a level-controlled electrical music output signal.

* * * * *